117,590

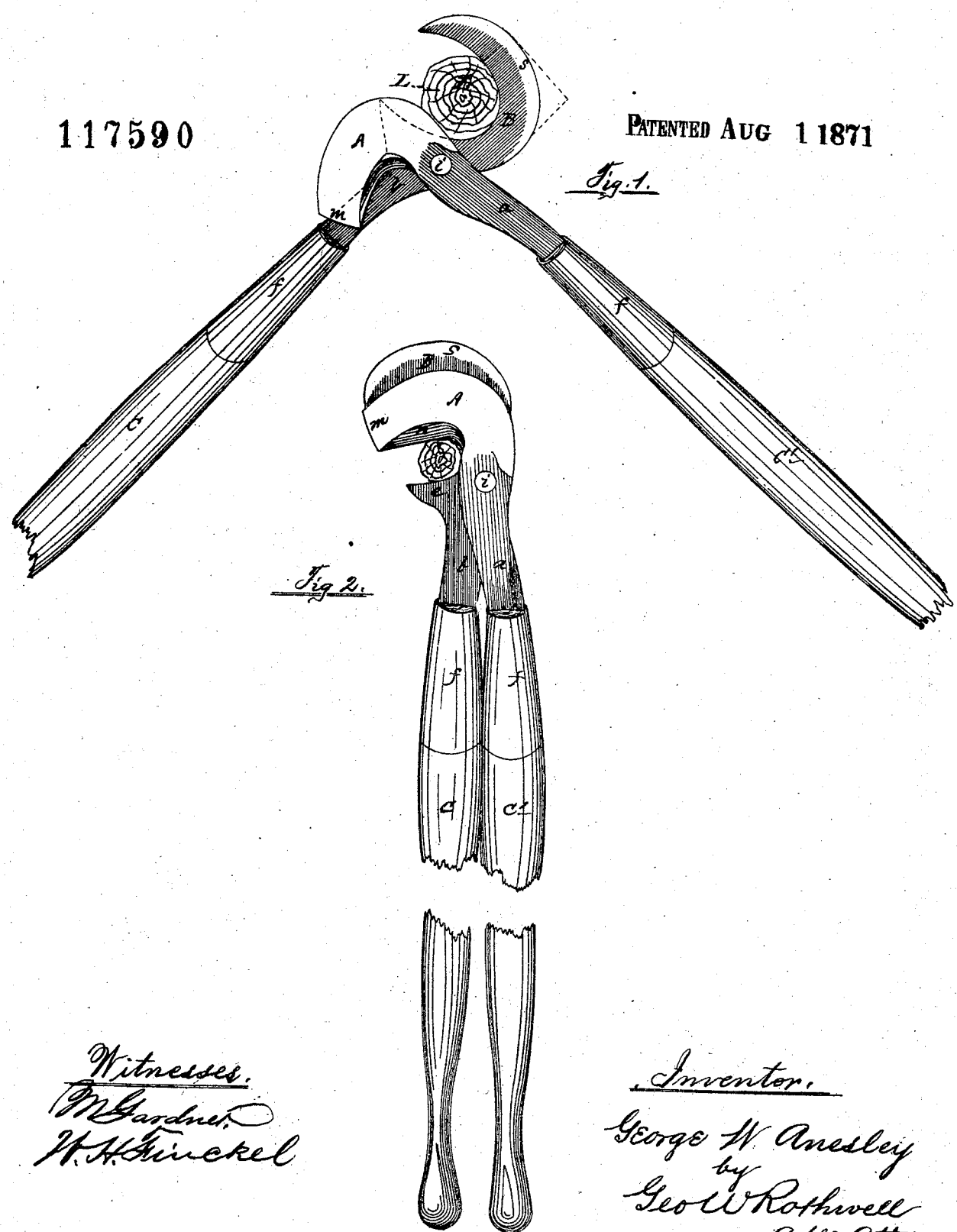

UNITED STATES PATENT OFFICE.

GEORGE W. ANESLEY, OF MARENGO TOWNSHIP, ASSIGNOR TO HIMSELF AND SAMUEL P. WORMLEY, OF MARSHALL, MICHIGAN.

IMPROVEMENT IN PRUNING-SHEARS.

Specification forming part of Letters Patent No. 117,590, dated August 1, 1871.

*To all whom it may concern:*

Be it known that I, GEORGE W. ANESLEY, of the township of Marengo, in the county of Calhoun and State of Michigan, have invented certain new and useful Improvements in Pruning-Tools, of which the following is a specification:

My invention is designed mainly as an improvement on the pruning-tool for which Letters Patent dated May 17, 1870, were granted to me; and relates partly to the peculiar conformation and arrangement, with the handles, of a curved cutting jaw-blade and a compound retaining and cutting-hook, projecting laterally, both in the same direction, so that the principal chords of their eccentric circular arcs will be at or about a right angle with the line of the handles, for the purpose of effecting a combined upward cutting and lateral drawing action, which last shall increase in degree as the jaw-blade penetrates the limb or branch being pruned. My invention also relates to combining with the jaw-hook a retaining-spur, which furnishes a bearing-guide for the cutting jaw-blade, and also, in addition, enables said blade, by the aid of a sharpened rear edge, to prune off limbs and shoots by the opening as well as by the closing movement of the handles, thereby saving much time and labor in their manipulation; and, further, a hatchet-edge is formed on the end of the cutting jaw-blade, and a chisel-edge on the periphery of the jaw-hook, whereby all the necessary chopping and paring operations in pruning may be readily effected.

My invention is fully exhibited in the accompanying drawing, in which Figure 1 is a side elevation, showing the jaws fully open and the handles (broken off) extended. Fig. 2 is a similar view, showing the supplemental jaws fully open and the handles fully closed.

To enable others skilled in the art to construct and use my invention, I will now proceed to fully describe the same.

A is the cutting jaw-blade, and B is the jaw-hook, provided with tangs *a b*, stoutly pivoted together at *i*. A spur-shaped projection, which I term a retaining-spur, as seen at *e*, is forged on the tang *b* of the jaw-hook, to be hereinafter more fully described. C C' are the two wooden handles (shown as broken off) banded with long stout ferrules *f f* at the ends, where the jaw tangs are tightly inserted and secured. The cutting jaw-blade A and the jaw-hook B are both curved eccentrically with the pivot center, so as to form a lateral projection, as shown, the chords of the main central curves lying at or about a right angle with the handles. The rear portion of the cutting-blade is chamfered, as shown at *n*, to a cutting-edge, so that the act of extending the handles to open the main jaws will sever a shoot interposed, as shown in Fig. 2, between this edge and the retaining-spur *e*, thus forming a pair of supplemental jaws; and from this rear chamfer the whole face of the blade should be chamfered to form a keen cutting-edge on all of the convex edge beyond the pivot and it is very useful to square and chamfer the extreme end of the blade at *m* to enable it to do duty as a hatchet to chop off small twigs, &c. The convex edge of the jaw-hook is also chamfered and ground sharp, as shown at *s*, to enable it to perform the additional duty of a paring-chisel, and, if desired, such edge may be squared, as seen by the dotted lines. Besides, or independent of the utility of the retaining-spur *e*, as a supplemental jaw its function as a guide-bearing for the one-sided chamfered cutting jaw-blade A is equally important and serviceable. It will be seen, by referring to the position of this spur, as shown by the dotted lines in Fig. 1, relatively with the opened blade, that an interposed limb, L, will be nearly cut through before the bearing is lost, and then the increased overlap on the tang end of the jaw-hook will steady the blade to complete the cut, so that if the pivot *i* should be worn even very loose, the sharp convex edge of the blade can never come in contact with the concave edge of the hook. Another special advantage is obtained, by my arrangement, in relation to the cutting action, for the blade does not pass crosswise through the limb, but partly circumferentially in the thinner line; hence it cuts cleaner, freer, and with the grain, without disruption or abrasion of the fibers.

The increased drawing or side action of my blade, as the handles are being brought closely together, produce, in addition, an unusually smooth cut through the bark at the end of the stroke, which is very important in expediting the healing of the stump.

I do not claim, broadly, an eccentrically-curved blade and hook for producing a drawing cut, as nearly all pruning devices contain this feature to some extent; neither do I claim the formation of a cutting-edge on the lower side of a pivoted jaw, as this is not new; but

I claim as my invention—

The jaw-hook B, constructed with the retaining-spur $e$, constituting a continuation of the cutting-edge of the hook, as shown, in combination with the cutting-jaw A pivoted at $i$, in line with said spur $e$, whereby the latter becomes a bearing-guide for the blade A, and also enables said blade, by means of a sharpened edge, $n$, to prune by the opening movement of the handles, as herein described.

GEORGE W. ANESLEY.

Witnesses:
 C. T. COOK,
 ROBERT WILLIAMSON.